US012651449B2

(12) United States Patent
    Donovan et al.

(10) Patent No.: US 12,651,449 B2
(45) Date of Patent: Jun. 9, 2026

(54) MODULAR ARTIFICIAL INTELLIGENCE PLATFORM FOR MEDIA GENERATION AND METHODS FOR USE THEREWITH

(71) Applicant: Virtuous AI, Inc., Los Gatos, CA (US)

(72) Inventors: Rory Donovan, Arroyo Grande, CA (US); Alan Salimov, Oakland, CA (US); Alexander Gluklick Braun, Oakland, MI (US); Kerim Doruk Karinca, San Francisco, CA (US)

(73) Assignee: Virtuous AI, Inc., Campbell, CA (US)

( * ) Notice: Subject to any disclaimer, the term of this patent is extended or adjusted under 35 U.S.C. 154(b) by 296 days.

(21) Appl. No.: 18/354,066

(22) Filed: Jul. 18, 2023

(65) Prior Publication Data

US 2025/0029375 A1     Jan. 23, 2025

(51) Int. Cl.
    *G06V 10/82*      (2022.01)
    *G06V 10/70*      (2022.01)
    *G06V 10/80*      (2022.01)

(52) U.S. Cl.
    CPC .............. *G06V 10/82* (2022.01); *G06V 10/80* (2022.01); *G06V 10/87* (2022.01)

(58) Field of Classification Search
    None
    See application file for complete search history.

(56) References Cited

U.S. PATENT DOCUMENTS

| | | | |
|---|---|---|---|
| 8,221,238 | B1 | 7/2012 | Shaw |
| 10,671,854 | B1 | 6/2020 | Mahyar |
| 10,905,962 | B2 | 2/2021 | Kaethler |
| 11,052,311 | B2 | 7/2021 | Bleasdale |
| 2006/0121990 | A1 | 6/2006 | O'Kelley |
| 2006/0247055 | A1 | 11/2006 | O'Kelley |
| 2006/0287096 | A1 | 12/2006 | O'Kelley |
| 2009/0234663 | A1 | 9/2009 | McCann |
| 2009/0325709 | A1 | 12/2009 | Shi |

(Continued)

FOREIGN PATENT DOCUMENTS

WO          2020092956 A1      5/2020

OTHER PUBLICATIONS

Zhang et al., "Hierarchical Cross-Modality Semantic Correlation Learning Model for Multimodal Summarization," arXiv: 2112. 12072v1 [cs.CV] Dec. 16, 2021 (Year: 2021).*

(Continued)

*Primary Examiner* — Soo Shin
(74) *Attorney, Agent, or Firm* — Katz, Ruby & Carle LLP; Katherine C. Stuckman; Bruce E. Stuckman

(57)          ABSTRACT

A modular artificial intelligence (AI) platform operates by: receiving media input that includes image data and text data; generating encoded text data via a text encoder module that includes first language processing AI; generating encoded image data via an image encoder module that includes a plurality of neural networks and a long short-term memory; generating concept structure data via a concept identification module that includes graph-based learning AI; generating decoded text data via a text decoder module that includes language processing AI; generating decoded image data, via an image decoder module that includes a plurality of neural networks and a long short-term memory; and combining the decoded image data and the decoded text data to generate media output data.

20 Claims, 16 Drawing Sheets

(56)                    References Cited

U.S. PATENT DOCUMENTS

| | | | |
|---|---|---|---|
| 2018/0373781 A1 | 12/2018 | Palrecha | |
| 2019/0028336 A1 | 1/2019 | Coronado et al. | |
| 2019/0213498 A1 | 7/2019 | Adjaoute | |
| 2019/0238934 A1 | 8/2019 | Yun | |
| 2019/0266912 A1 | 8/2019 | Barzman | |
| 2019/0291008 A1 | 9/2019 | Cox | |
| 2020/0078688 A1 | 3/2020 | Kaethler | |
| 2020/0142999 A1 | 5/2020 | Pedersen | |
| 2020/0250525 A1 | 8/2020 | Kumar Addepalli et al. | |
| 2020/0364727 A1 | 11/2020 | Scott-Green | |
| 2021/0004440 A1 | 1/2021 | Purnell | |
| 2021/0038979 A1 | 2/2021 | Bleasdale | |
| 2021/0168166 A1 | 6/2021 | Liu | |
| 2022/0012296 A1* | 1/2022 | Marey | H04L 51/52 |
| 2022/0198144 A1* | 6/2022 | Yang | G06N 20/00 |
| 2022/0263860 A1* | 8/2022 | Crabtree | H04L 63/1425 |
| 2022/0377083 A1 | 11/2022 | Kim | |
| 2024/0331235 A1* | 10/2024 | Smock | G16C 20/70 |
| 2024/0386015 A1* | 11/2024 | Crabtree | G06F 16/9024 |
| 2025/0029375 A1* | 1/2025 | Donovan | G06N 3/042 |

OTHER PUBLICATIONS

Kapoor et al., "Underwater Moving Object Detection using an End-to-End Encoder-Decoder Architecture and GraphSage with Aggregator and Refactoring," 2023 IEEE/CVF Conference on Computer Vision and Pattern Recognition Workshops (CVPRW), Jun. 17-24, 2023 (Year: 2023).*

Wang et al., "Learning to Compose Topic-Aware Mixture of Experts for Zero-Shot Video Captioning," 1811.02765v2 [cs.CL] Nov. 23, 2018 (Year: 2018).*

Zhibin Lu, "VGCN-BERT : Augmenting BERT with Graph Embedding for Text Classification—Application to offensive language detection," Université de Montréal Thesis, 2020 (Year: 2020).*

Hendrycks et al.; Aligning AI with Shared Human Values; arXiv:2008.02275v5, Jul. 2021; 30 pgs.

International Searching Authority; International Search Report and Written Opinion; International Application No. PCT/US2022/041024; Dec. 21, 2022; 11 pgs.

European Patent Office; Extended European Search Report; Application No. 24177224.3; Feb. 4, 2025; 12 pgs.

Kapoor et al., Underwater Moving Object Detection using an End-to-End Encoder-Decoder Architecture and GraphSage with Aggregator and Refactoring, 2023 IEEE/CVF Conference on Computer Vision and Pattern Recognition Workshops (CVPRW), IEEE, Jun. 17, 2023 (Jun. 17, 2023), pp. 5636-5645, XP034396727, DOI: 10.1109/CVPRW59228.2023.00597 [retrieved on Aug. 15, 2023].

Wang et al., Learning to Compose Topic-Aware Mixture of Experts for Zero-Shot Video Captioning, arxiv.org, Cornell University Library, Nov. 7, 2018 (Nov. 7, 2018), XP081047116.

You et al., Implicit Anatomical Rendering for Medical Image Segmentation with Stochastic Experts, arxiv.org, Cornell University Library, Apr. 6, 2023 (Apr. 6, 2023), XP091478597.

Zhang et al., Hierarchical Cross-Modality Semantic Correlation Learning Model for Multimodal Summarization, arxiv.org, Cornell University Library, Dec. 16, 2021, (Dec. 16, 2021), XP091122580.

* cited by examiner

150

To combiner 99

Text decoder module 113

Language processing AI 171-2

Transformer 177-2

From text encoder module 111 and concept identification module 119

Text encoder module 111

Language processing AI 171-1

Transformer 177-1

To text decoder module 113 and concept identification module 119

From concept identification module 119

Media input 170 computing entity 210 computing entity 210 computing entity 210 computing entity 210 computing entity 210 computing device 220 computing device 220 computing device 220 computing device 220

HWI = hardware interface (driver)

computing device 220 hardware 280 database

300

MODULAR ARTIFICIAL INTELLIGENCE PLATFORM FOR MEDIA GENERATION AND METHODS FOR USE THEREWITH

TECHNICAL FIELD

The present disclosure relates to processing systems and applications used in the training and/or use of artificial intelligence (AI) models and/or other devices for use in generating media content.

DETAILED DESCRIPTION

Figure 1A:
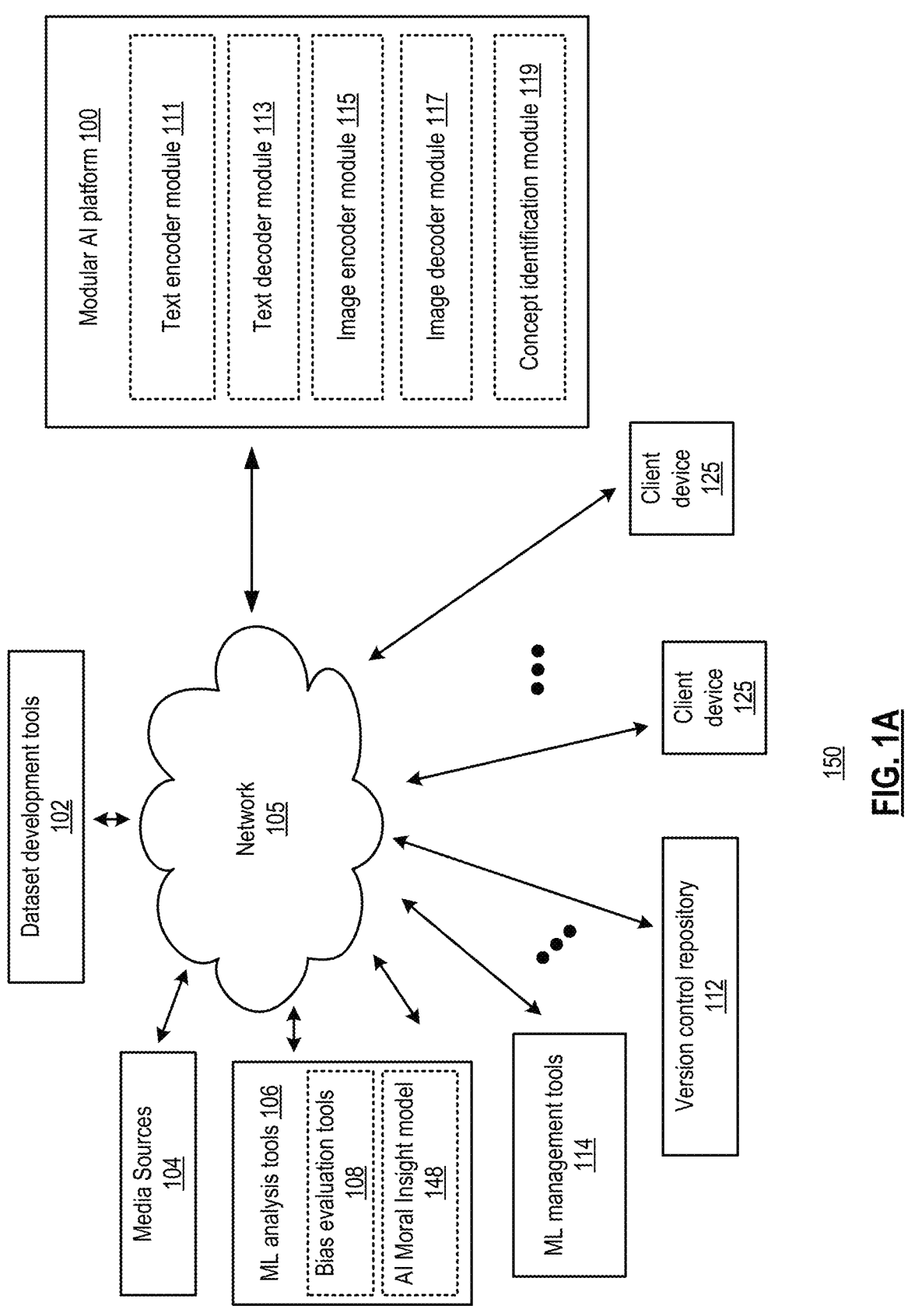
FIG. 1A presents a block diagram representation of a system in accordance with an example of the present disclosure.

FIG. 1A presents a block diagram representation of a system in accordance with an example of the present disclosure. In particular, a modular AI platform 100 is presented that communicates media data via network 105. The network 105 can be the Internet or other wide area or local area network, either wired or wireless and either public or private. In various examples, the modular AI platform 100 operates based on multiple different AI layers configured in a modular fashion, by receiving media input that include text data or other language input and image data such as graphics, still images, video and/or images in pages or other structures for example, as public training data from media sources 104 such as library data, website data such as HTML data, and optionally private/client data such as JSON data or data in other formats, etc. Once trained, the modular AI platform 100 produces media output in the form of new, enhanced and/or alternative content, answers predictions and/or other responses corresponding to the media input (e.g., further client/private data) from client devices 125. For example, the modular AI platform 100 can receive media input from client devices 125 wishing to generate media output having similar but enhanced and/or otherwise different text and/or image content. In further examples the media inputs can be in the form of questions and/or other queries and the media outputs can be in the form answers, predictions and/or other responses.

Artificial intelligence (AI) is an increasingly popular technology that has the potential to revolutionize the world as we know it. The term generative AI refers to a class of artificial intelligence algorithms that can generate new data that is similar to the data it was trained on. This type of AI can be used to create images, music, text, or other types of content that are virtually indistinguishable from content created by human beings. Generative AI algorithms generally use deep learning techniques, such as neural networks, to analyze and learn patterns in large datasets, and then use this knowledge to generate, based on input data, new content that is similar to the original data it was trained on. This technology has numerous applications, including in creative and professional industries, healthcare, robotics, and more.

In spite of the power of these techniques, there are also dangers associated with AI that rely on blackbox neural networks. These systems are designed to learn from data and make decisions based on that data. However, the inner workings of these systems are often not transparent, which can lead to unintended consequences. One of the main dangers of blackbox neural networks is the potential for bias. These systems are trained on large datasets, and if those datasets are biased, the system will learn that bias. This can lead to discrimination against certain groups of people, such as minorities or women. Additionally, if the system is used to make decisions that affect people's lives, such as hiring or lending decisions, this bias can have a significant impact on their opportunities and well-being.

Furthermore, blackbox neural networks can also lead to a loss of accountability, for example, by generating questionable or inaccurate results. This can lead to a lack of transparency and trust in the system, which can ultimately undermine public confidence in AI altogether. The modular AI platform 100 addresses these issues and improves the technology of artificial intelligence systems by providing a modular design comprising understandable and explainable components that generate accurate, reliable, transparent and accountable media output.

The modular AI platform 100 includes:

a. A text encoder module 111 and image encoder module 115 for encoding media input received via the network 105.

b. A concept identification module 119 that includes graph-based learning AI.

c. A text decoder module 113 and image decoder module 117 for generating media output and that operate based on output from the concept identification module 119, the text encoder module 111 and image encoder module 115.

In operation, the modular AI platform 100 facilitates the development of various training datasets, via dataset development tools 102 that are used to develop the various AI models that are employed. Versions of these AI models and these training datasets can be stored in the version control repository 112.

The modular AI platform 100 can access a plurality of machine learning (ML) analysis tools 106 to facilitate the evaluation of AI models. These ML analysis tools 106 can include at least one bias evaluation tool 108 that predicts a bias associated with one or more AI models and at least one AI moral insight model 148 that generates predicted moral score data associated with one or more AI models. The modular AI platform 100 can also access one or more machine learning management tools 114 to perform other management operations associated with AI models, training datasets, etc.

Consider the following example wherein the modular AI platform 100 includes a network interface configured to communicate via a network 105, at least one processor; and a non-transitory machine-readable storage medium that stores operational instructions that, when executed by the at least one processor, cause the at least one processor to perform operations that include:

receiving, via the network interface, media input that includes image data and text data associated therewith;

generating encoded text data, based on the text data and via a text encoder module that includes first language processing;

generating encoded image data, based on the image data and via an image encoder module that includes a first plurality of neural networks and at least one first long short-term memory;

generating concept structure data, based on the encoded text data and the encoded image data and via a concept identification module that includes graph-based learning AI;

generating decoded text data, based on the concept structure data and the encoded text data and via a text decoder module that includes second language processing AI;

generating decoded image data, based on the concept structure data and the encoded image data and via an image decoder module that includes a second plurality of neural networks and at least one second long short-term memory; and combining the decoded image data and the decoded text data to generate media output data.

In addition or alternative to any of the foregoing, the image decoder module and the text decoder module are trained based on the concept structure data.

In addition or alternative to any of the foregoing, the image encoder module and the text encoder module are trained based on the concept structure data.

In addition or alternative to any of the foregoing, the first language processing AI includes a Bidirectional Encoder Representations from Transformers (BERT) AI model.

In addition or alternative to any of the foregoing, the second language processing AI includes a Bidirectional Encoder Representations from Transformers (BERT) AI model.

In addition or alternative to any of the foregoing, the first plurality of neural networks includes k U-net models operating as k-experts.

In addition or alternative to any of the foregoing, the k-experts are trained independently on different subsets of the data, and outputs of k-experts are then combined for each input image of the image data.

In addition or alternative to any of the foregoing, the concept identification module includes a third long short-term memory that processes the encoded image data for input to the graph-based learning AI.

In addition or alternative to any of the foregoing, the concept identification module includes a fourth long short-term memory that processes the encoded text data for input to the graph-based learning AI.

In addition or alternative to any of the foregoing, the graph-based learning AI operates based on a GraphSAGE model.

It should be noted that while the text encoder module 111, text decoder module 113, image encoder module 115, image decoder module 117 and concept identification module 119 are shown as internal to the modular AI platform 100, and further, the dataset development tools 102, ML analysis tools 106, ML management tools 114 and the version control repository 112 are shown as being external to the modular AI platform 100, in other examples, each of these various elements can be implemented either external or internal to the modular AI platform 100. Furthermore, the modular AI platform 100 can be implemented in a cloud computing configuration with the text encoder module 111, text decoder module 113, image encoder module 115, image decoder module 117 and concept identification module 119, the dataset development tools 102, ML analysis tools 106, ML management tools 114 and/or the version control repository 112 implemented within the cloud.

Additional examples, including different combinations, functions and features are described in conjunction with the other figures and the description that follows.

Figure 1B:
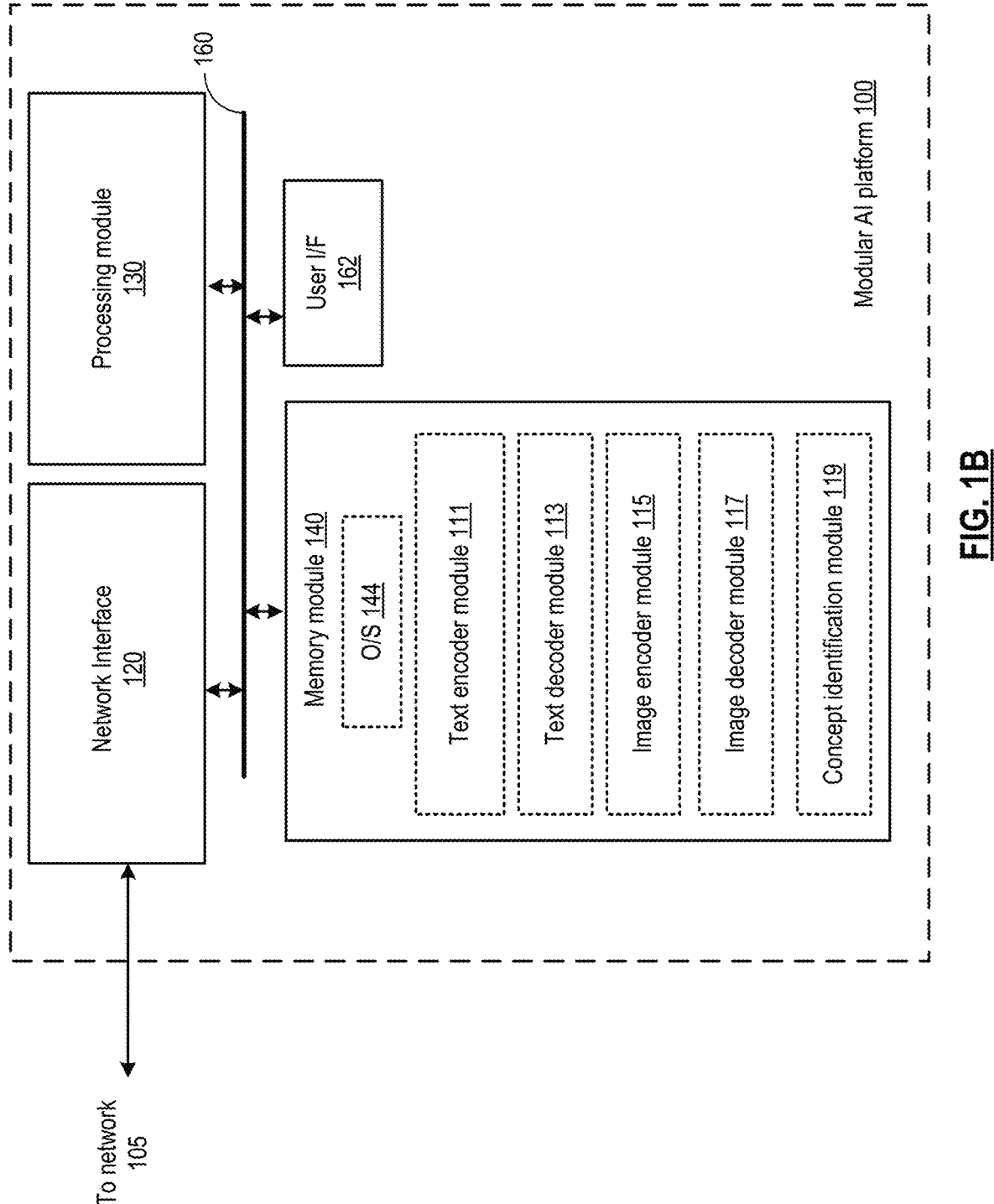
FIG. 1B presents a block diagram representation of a modular AI platform in accordance with an example of the present disclosure.

FIG. 1B presents a block diagram representation of a modular AI platform 100 in accordance with an example of the present disclosure. In particular, the modular AI platform 100 includes a network interface 120 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 105.

The modular AI platform 100 also includes a processing module 130 and memory module 140 that stores an operating system (O/S) 144 such as an Apple, Unix, Linux or Microsoft operating system or other operating system, the text encoder module 111, text decoder module 113, image encoder module 115, image decoder module 117 and concept identification module 119. In particular, the O/S 444 the learning and the text encoder module 111, text decoder module 113, image encoder module 115, image decoder module 117 and concept identification module 119 each include operational instructions that, when executed by the processing module 130, cooperate to configure the processing module into a special purpose device to perform the particular functions of the modular AI platform 100 described herein.

The modular AI platform 100 may also include a user interface (I/F) 162 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the modular AI platform 100, such as a system programmer, administrator, etc., that generate data in response to the user's interaction with modular AI platform 100.

The processing module 130 can be implemented via a single processing device or a plurality of processing devices. Such processing devices can include a microprocessor, micro-controller, graphics processing unit, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 140. The memory module 140 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. In various examples, cache-less data management can be employed to increase the input/output speed of the processing. While a particular bus architecture is presented that includes a single bus 160, other architectures are possible including additional data buses and/or direct connectivity between one or more elements. Further, the modular AI platform 100 can include one or more additional elements that are not specifically shown.

Figure 1C:
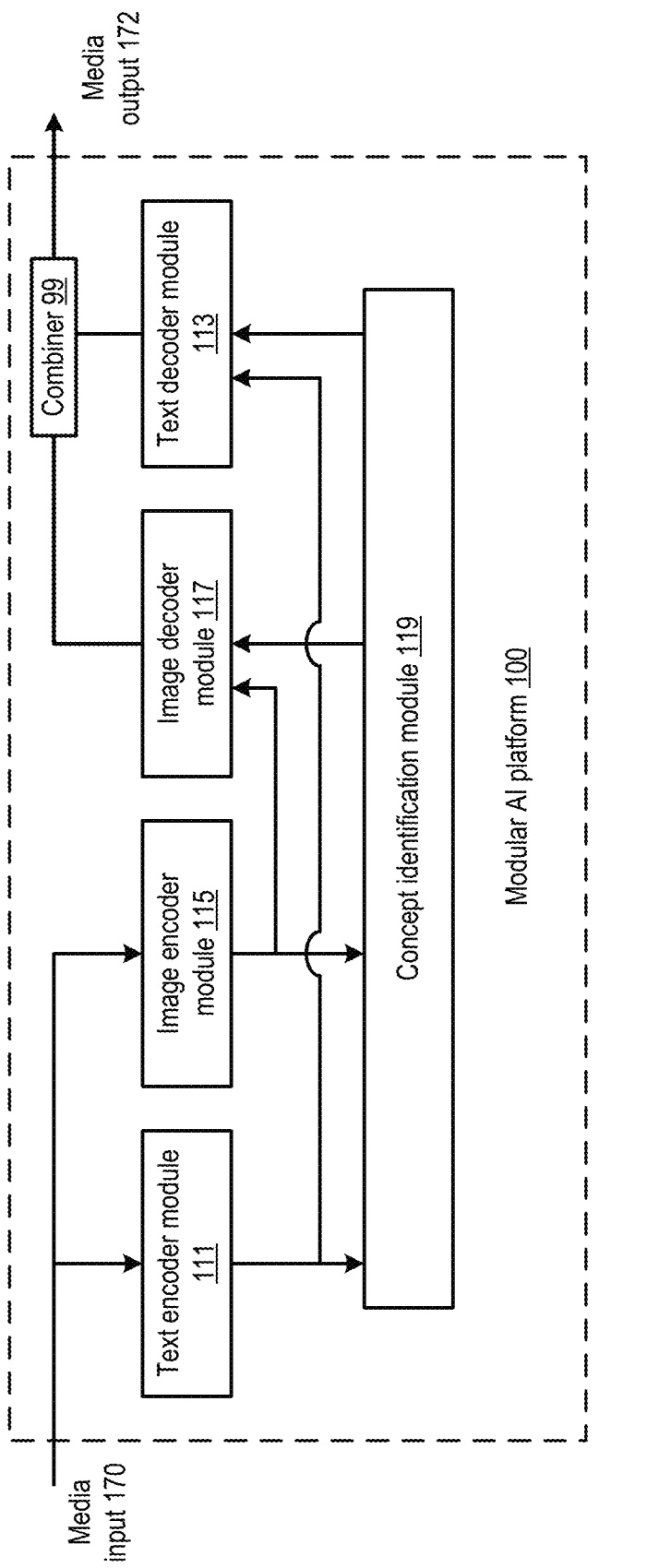
FIG. 1C presents a block diagram representation of a modular AI platform in accordance with an example of the present disclosure.

FIG. 1C presents a block diagram representation of a modular AI platform 100 in accordance with an example of the present disclosure. In particular, an example interaction/flow is presented between the various modules. In this example, modular AI platform 100 receives media input 170 that includes image data and text data associated therewith. In various examples, the media input is web information or other data organized in a hierarchical structure that separates text and/or images as to the hierarchy from which they are presented (e.g. headers, main body, launch pages, subsidiary links etc.). In this fashion a restaurant page for example, can have a high level with menus, location and restaurant images, have lower levels with directions, separate breakfast lunch and dinner menus, have lower sub-menus with descriptions and images of menu items, etc. Text encoder module 111 generates encoded text data, based on the text data portion of the media input 170. The image encoder module 115 generates encoded image data, based on the image data potion of the media input 170.

The concept identification module 119 generates concept structure data based on the encoded text data and the encoded image data. The text decoder module 113 generates decoded text data based on the concept structure data and the encoded text data. The image decoder module 117 generates decoded image data based on the concept structure data and the encoded image data. The combiner 99 combines the decoded image data and the decoded text data to generate media output 172, such as multimedia page including text and imagery. As previously noted, AI of the image decoder module 117, text decoder module 113, image encoder module 115 and/or the text encoder module 111 can be trained based on concept structure data generated by concept identification module 119.

Black-box systems are constructed of a multitude of layers of arbitrary (solely AI-related) functionality that lack a corresponding real-world meaning and/or are otherwise opaque to the problem at hand. In contrast, the modular AI platform 100 separates into modules, the following understandable and explainable functionalities:

Text encoding (e.g., language comprehension)
Text decoding (e.g., language generation/regeneration)
Image encoding (e.g., image comprehension)
Image decoding (e.g., image generation/regeneration)
Concept identification (e.g., learning the structure/context of the text and image components of input media and/or the structure/context of how the text and image components relate to one another)

The separation of these functions into discrete modules with an inherent function/meaning that allows at least some of the training (e.g., preliminary training) to be segregated on a module-by-module basis, with only a portion of the training (e.g., final training) to be performed on the overall system. The separation of these functions into discrete modules further helps promote less-expensive, more accurate, reliable, transparent and accountable media output. In particular, if inaccuracy or bias is detected during training, the layer or layers of the AI that are the source can be easily isolated to correct the issue. Consider an example where media output corresponding to a board room includes imagery that shows exclusively white individuals. This bias can be identified and the likely source, the image decoder module 117 for example, can be isolated for separate training. Consider further an example where media output corresponding to a board room includes text identifying the board members via exclusively male pronouns. This bias can be identified and the likely source, the text decoder module 113 for example, can be isolated for separate training.

Figures 1D, 1E:
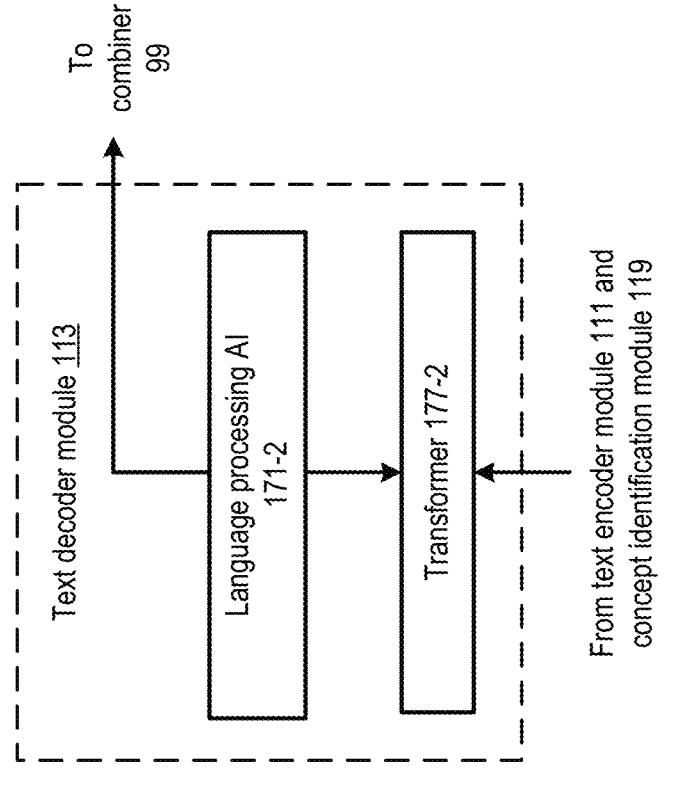
FIG. 1D presents a block diagram representation of a text encoder module in accordance with an example of the present disclosure.
FIG. 1E presents a block diagram representation of a text decoder module in accordance with an example of the present disclosure.

FIG. 1D presents a block diagram representation of a text encoder module 111 in accordance with an example of the present disclosure. In the example shown, the text encoder module 111 includes language processing AI 171-1 and a transformer 177-1 that combine to encode input text/language time sequences/series on a word, sentence, paragraph, page, HTML chunks, chapter and/or document level, for example, on a graphical/tree basis. In other examples, the transformer 177-1 can be omitted.

In various examples, the language processing AI 171-1 includes a Bidirectional Encoder Representations from Transformers (BERT) AI model. BERT is based on transformers, deep learning models in which every output element is connected to every input element, and the weightings between them are dynamically calculated based upon their connection. Specifically, BERT encoding can operate via several encoder layers, such as:

Tokenization: The text is first tokenized using a tokenizer such as WordPiece or SentencePiece. This step converts the text into a sequence of tokens, which can then be fed into the BERT model.

Padding: The token sequence is then padded to ensure that all inputs are of the same length. This is done by adding special tokens such as [PAD] to the end of shorter sequences.

Segment Embeddings: BERT uses segment embeddings to differentiate between different sentences or segments within a single input. These embeddings are added to the token sequence to indicate the beginning and end of each segment.

Position Embeddings: BERT also uses position embeddings to encode the position of each token within the input sequence. These embeddings are added to the token sequence to indicate the relative position of each token.

Masking: BERT uses masking to prevent the model from using information from future tokens during training. This is done by randomly masking some of the tokens in the input sequence and predicting them based on the surrounding context.

After the BERT text encoding, the resulting vectors can be fed into transformer 177-1, e.g., a transformer-based model that performs one or more natural language processing tasks such as text classification, question answering, and text generation. This transformer 177-1, when included, can take the BERT-encoded vectors as input and apply a series of attention-based operations to extract relevant information from the input sequence. This attention mechanism allows the model to focus on the most relevant parts of the input sequence, while ignoring the irrelevant parts. The transformer 177-1 can also be fine-tuned on a specific task by adding additional layers and training the model on a task-specific training dataset. The fine-tuning process can involve adjusting the weights of the model to optimize its performance based on the task at hand. As previously discussed, this training can be based on concept structure data generated by concept identification module 119.

FIG. 1E presents a block diagram representation of a text decoder module 113 in accordance with an example of the present disclosure. In the example shown, the text decoder module 113 includes language processing AI 171-2 and a transformer 177-2 that operate similarly/reciprocally to the text encoder module 111. In various examples, the language processing AI 171-2 also includes a Bidirectional Encoder Representations from Transformers (BERT) AI model. In other examples the transformer 177-2 can be omitted.

Figures 1F, 1G:
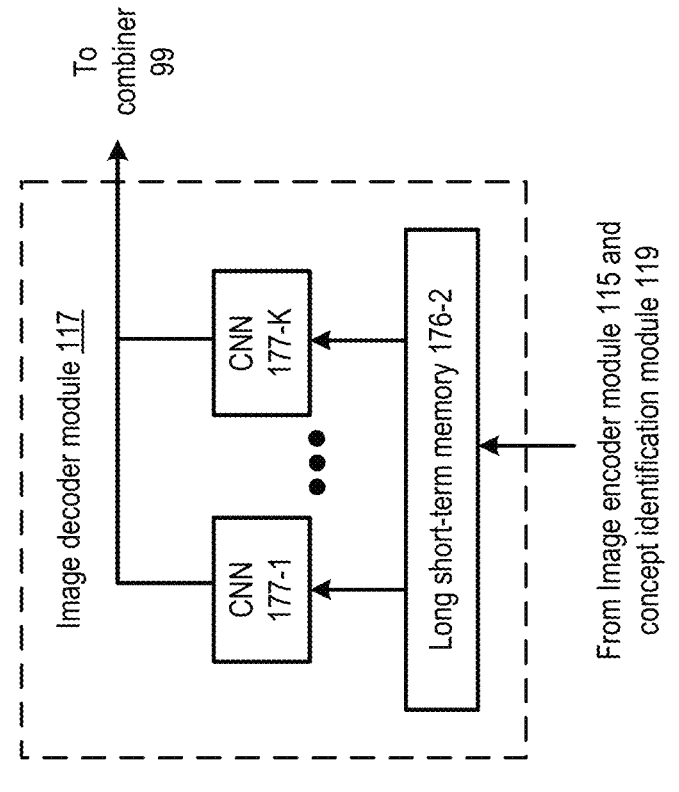
FIG. 1F presents a block diagram representation of an image encoder module in accordance with an example of the present disclosure.
FIG. 1G presents a block diagram representation of an image decoder module in accordance with an example of the present disclosure.

FIG. 1F presents a block diagram representation of an image encoder module 115 in accordance with an example of the present disclosure. In the example shown, the image encoder module 115 includes k convolutional neural networks (CNN 175-1 . . . CNN 175-k) and at a long short-term memory (LSTM) 176-1. For example, these k convolutional neural networks can be implemented via k U-net models operating as k-experts. U-net models with k-experts are a type of deep learning architecture that can be used for image segmentation tasks. These k-experts can each consist of an encoder network that down-samples the input image and a decoder network that up-samples the output segmentation map. The k-experts can be trained independently on different subsets of the data. In some examples, outputs of k-experts can then be combined using a gating mechanism that selects the most relevant one of the k-experts for each input image of the image data. The gating mechanism can be implemented, for example, using a softmax function or a learnable attention mechanism. In other examples, results from the k-experts can be averaged or otherwise combined to produce an overall/aggregated encoded image output.

The advantage of using U-net models with k-experts is that it allows for better generalization and robustness to changes in the input data. Each expert can be specialized into a different aspect of the input data. This can lead to better performance on challenging datasets with diverse and complex images of differing types.

LSTMs are a type of artificial neural network that are able to remember long-term dependencies and relationships between inputs and outputs over time. LSTM models consist of a series of memory cells (e.g. nodes) that can store information for a long period of time, along with gates that can operate to select, filter, aggregate and/or otherwise control the flow of information. In particular, the LSTM 176-1 is designed to selectively allow or block information from ones of the k-experts based on the current input and the past state of the model, and/or to average, combine or otherwise aggregate the results from the k-experts to generate not only the information provided to the concept identification module 119 but also the also the image decoder module 117.

FIG. 1G presents a block diagram representation of an image decoder module 117 in accordance with an example of the present disclosure. In the example shown, the image decoder module 117 includes k convolutional neural networks (CNN 177-1 . . . CNN 177-k) and at a long short-term memory (LSTM) 176-2 that operate similarly/reciprocally to the image encoder module 115.

Figure 1H:
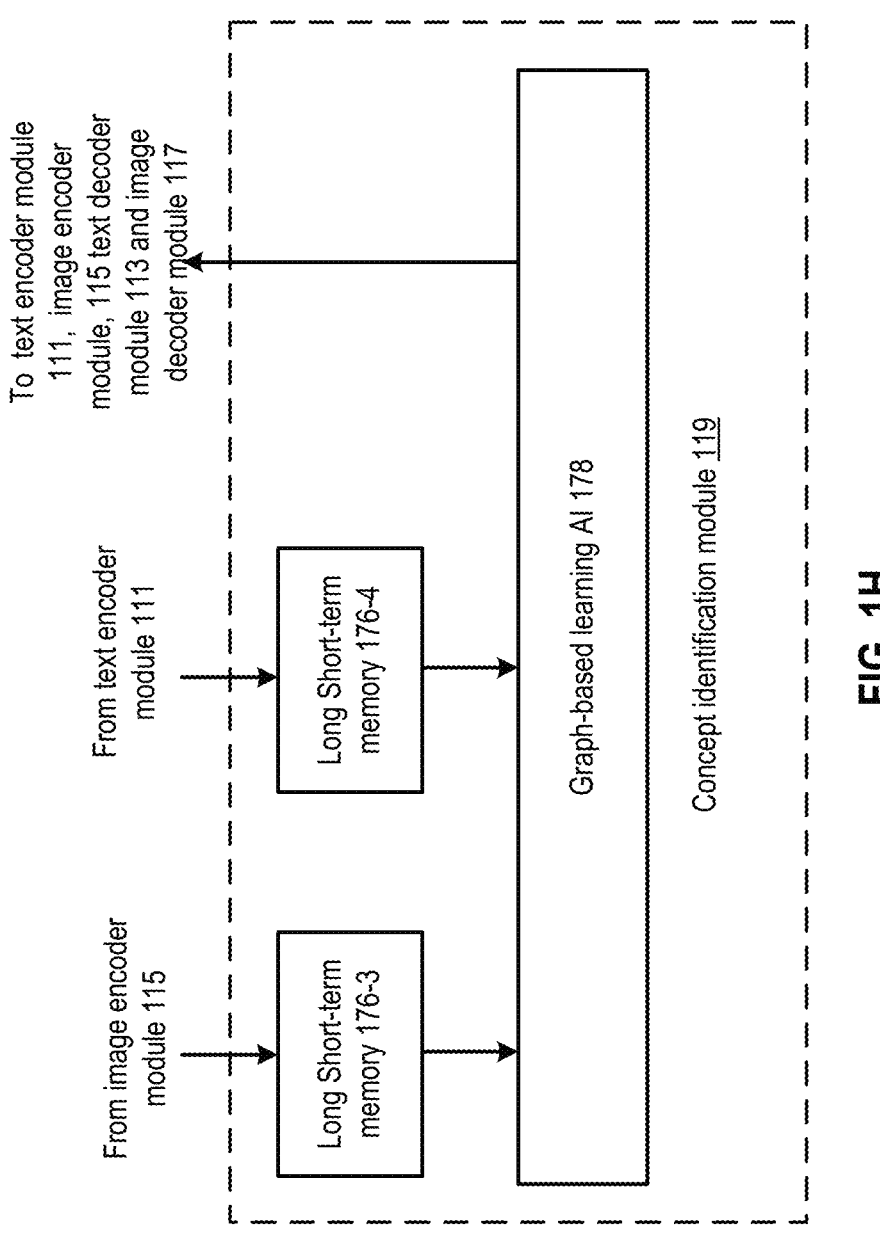
FIG. 1H presents a block diagram representation of a concept identification module in accordance with an example of the present disclosure.

FIG. 1H presents a block diagram representation of a concept identification module 119 in accordance with an example of the present disclosure. In the example shown, the concept identification module 119 includes graph-based learning AI 178 and LSTMs 176-3 and 176-4 that process outputs from the image encoder 115 and text encoder 111 for input to the graph-based learning AI 176. In this fashion, the graph-based learning AI 176 can learn the structure of processed training data and other input in order to, for example, provide training inferences, predictions and/or other feedback externally and/or to the other modules—during training and/or operation of the trained platform. Training of the graph-based learning AI 176 on libraries of text and web information allows input text and/or image data to be correlated to relevant knowledge contained in the graph-based learning AI 176 to further seed responses to the text and image encoders with text and images that are identified via the AI.

In various examples, the graph-based learning AI 176 operates based on a GraphSAGE model. GraphSAGE is a machine learning model that is specifically designed for graph data. It is an unsupervised learning model that learns node embeddings, or vector representations of nodes in a graph, using a neural network. The GraphSAGE model is able to learn from the topology of the graph, as well as the features of the nodes and edges, to generate high-quality node embeddings that can be used for downstream tasks such as node classification, link prediction, and recommendation systems. The model is able to scale to large graphs and can handle heterogeneous graphs with different types of nodes and edges.

As previously noted, AI of the image decoder module 117, text decoder module 113, image encoder module 115 and/or the text encoder module 111 can be trained based on concept structure data generated by concept identification module 119.

It should also be noted that the modular AI platform 100, the modules thereof and their components and/or any of the other components of the system 150 can be implemented via a computing entity 210. In this regard, FIGS. 2A through 2E are schematic block diagram of embodiments of such computing entities.

Figures 2A, 2B, 2C, 2D, 2E:
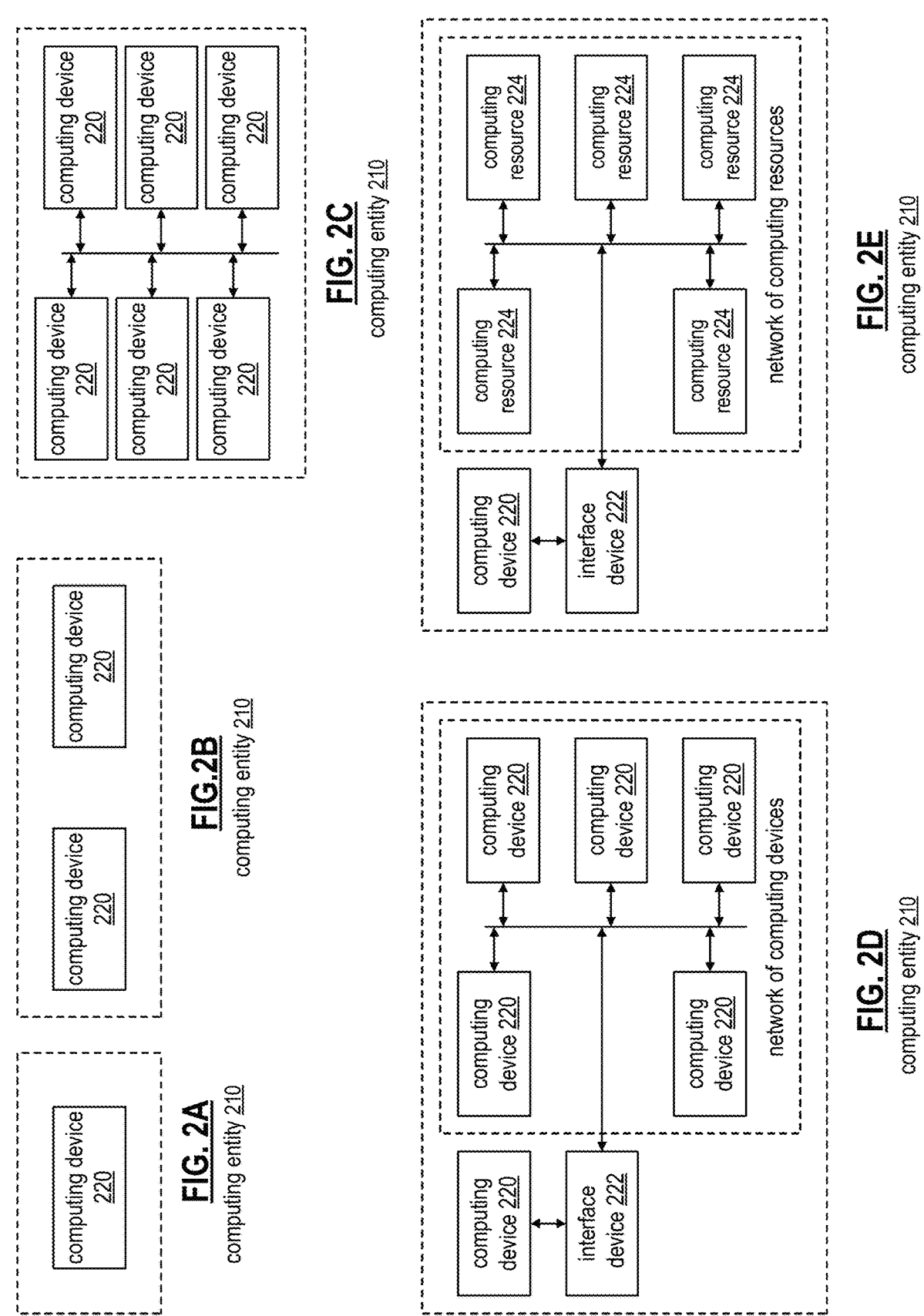
FIGS. 2A through 2E are schematic block diagrams of examples of computing entities that are part of an improved computer technology.

FIG. 2A is schematic block diagram of an embodiment of a computing entity 220 that includes a computing device 220 (e.g., one or more of the embodiments of FIGS. 2F-2L). A computing device may function as a user computing device, a server, a system computing device, a data storage device, a data security device, a networking device, a user access device, a cell phone, a tablet, a laptop, a printer, a game console, a satellite control box, a cable box, etc.

FIG. 2B is schematic block diagram of an embodiment of a computing entity 220 that includes two or more computing devices 220 (e.g., two or more from any combination of the embodiments of FIGS. 2F-2L). The computing devices 220 perform the functions of a computing entity in a peer processing manner (e.g., coordinate together to perform the functions), in a master-slave manner (e.g., one computing device coordinates and the other support it), and/or in another manner.

FIG. 2C is schematic block diagram of an embodiment of a computing entity 220 that includes a network of computing devices 220 (e.g., two or more from any combination of the embodiments of FIGS. 2F-2L). The computing devices are coupled together via one or more network connections (e.g., WAN, LAN, cellular data, WLAN, etc.) and perform the functions of the computing entity.

FIG. 2D is schematic block diagram of an embodiment of a computing entity 220 that includes a primary computing device (e.g., any one of the computing devices of FIGS. 2F-2L), an interface device (e.g., a network connection), and a network of computing devices 220 (e.g., one or more from any combination of the embodiments of FIGS. 2F-2L). The primary computing device utilizes the other computing devices as co-processors to execute one or more the functions of the computing entity, as storage for data, for other data processing functions, and/or storage purposes.

FIG. 2E is schematic block diagram of an embodiment of a computing entity 220 that includes a primary computing device (e.g., any one of the computing devices of FIGS. 2F-2L), an interface device (e.g., a network connection) 222, and a network of computing resources 224 (e.g., two or more resources from any combination of the embodiments of FIGS. 2F-2L). The primary computing device utilizes the computing resources as co-processors to execute one or more the functions of the computing entity, as storage for data, for other data processing functions, and/or storage purposes.

Figure 2F:
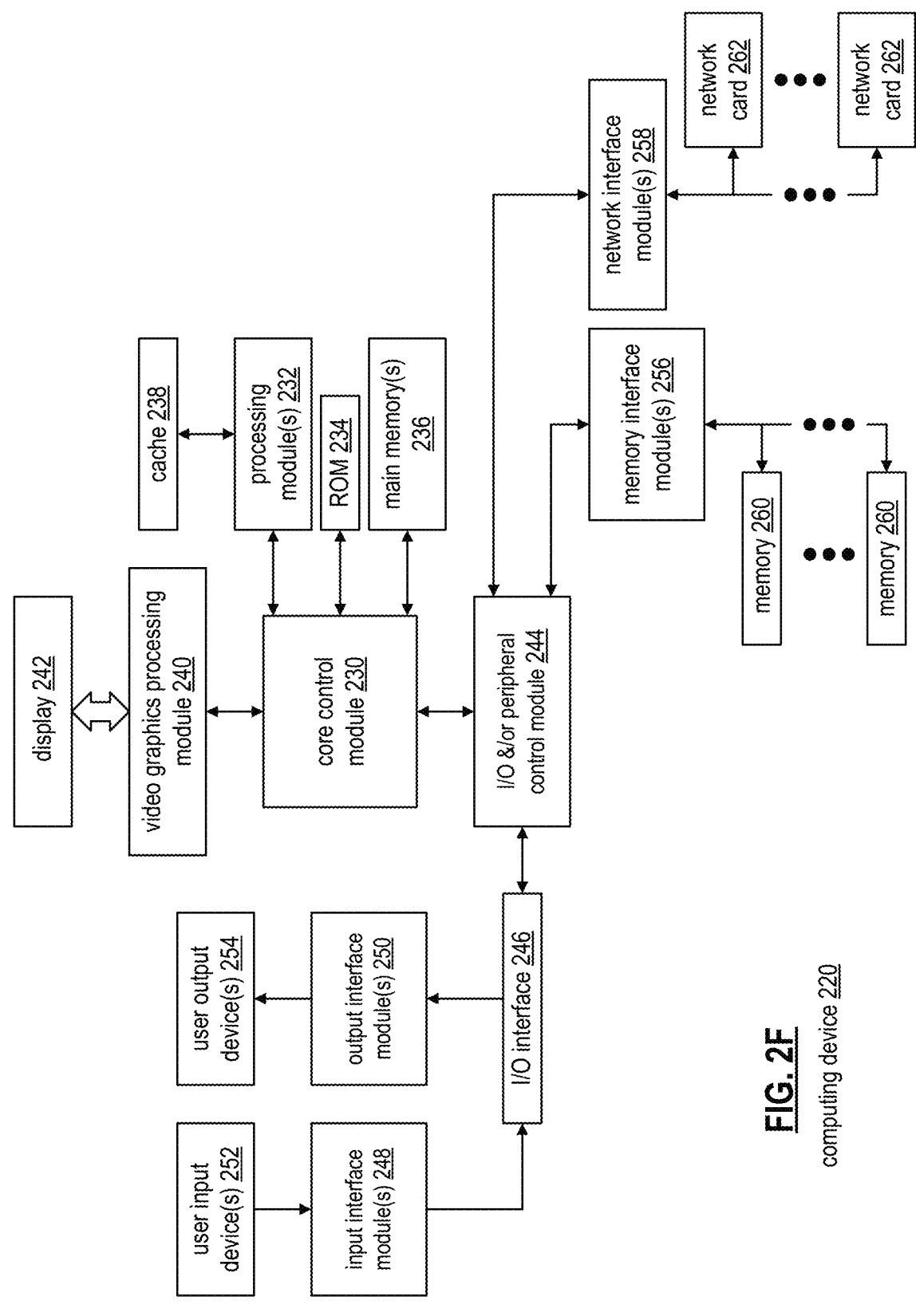
FIGS. 2F through 2L are schematic block diagrams of examples of computing devices that form at least a portion of a computing entity.

FIGS. 2F-2L are schematic block diagram of embodiments of computing devices that form at least a portion of a computing entity. FIG. 2F is a schematic block diagram of an embodiment of a computing device 220 that includes a plurality of computing resources. The computing resources, which form a computing core, include one or more core control modules 230, one or more processing modules 232, one or more main memories 236, a read only memory (ROM) 234 for a boot up sequence, cache memory 238, one or more video graphics processing modules 240, one or more displays 242 (optional), an Input-Output (I/O) peripheral control module 244, an I/O interface module 246 (which could be omitted if direct connect IO is implemented), one or more input interface modules 248, one or more output interface modules 250, one or more network interface modules 258, and one or more memory interface modules 256.

A processing module 232 is described in greater detail at the end of the detailed description section and, in an alternative embodiment, has a direction connection to the main memory 236. In an alternate embodiment, the core control module 230 and the I/O and/or peripheral control module 244 are one module, such as a chipset, a quick path interconnect (QPI), and/or an ultra-path interconnect (UPI).

The processing module 232, the core module 230, and/or the video graphics processing module 240 form a processing core for the improved computer. Additional combinations of processing modules 232, core modules 230, and/or video graphics processing modules 240 form co-processors for the improved computer for technology. Computing resources 224 of FIG. 2E include one more of the components shown in this FIG. and/or in or more of FIGS. 2G through 2L.

Each of the main memories 236 includes one or more Random Access Memory (RAM) integrated circuits, or chips. In general, the main memory 236 stores data and operational instructions most relevant for the processing module 232. For example, the core control module 230 coordinates the transfer of data and/or operational instructions between the main memory 236 and the secondary memory device(s) 260. The data and/or operational instructions retrieved from secondary memory 260 are the data and/or operational instructions requested by the processing module or will most likely be needed by the processing module. When the processing module is done with the data and/or operational instructions in main memory, the core control module 230 coordinates sending updated data to the secondary memory 260 for storage.

The secondary memory 260 includes one or more hard drives, one or more solid state memory chips, and/or one or more other large capacity storage devices that, in comparison to cache memory and main memory devices, is/are relatively inexpensive with respect to cost per amount of data stored. The secondary memory 260 is coupled to the core control module 230 via the I/O and/or peripheral control module 244 and via one or more memory interface modules 256. In an embodiment, the I/O and/or peripheral control module 244 includes one or more Peripheral Component Interface (PCI) buses to which peripheral components connect to the core control module 230. A memory interface module 256 includes a software driver and a hardware connector for coupling a memory device to the I/O and/or peripheral control module 244. For example, a memory interface 256 is in accordance with a Serial Advanced Technology Attachment (SATA) port.

The core control module 230 coordinates data communications between the processing module(s) 232 and network(s) via the I/O and/or peripheral control module 244, the network interface module(s) 258, and one or more network cards 262. A network card 260 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 258 includes a software driver and a hardware connector for coupling the network card to the I/O and/or peripheral control module 244. For example, the network interface module 258 is in accordance with one or more versions of IEEE 802.11, cellular telephone protocols, 10/100/1000 Gigabit LAN protocols, etc.

The core control module 230 coordinates data communications between the processing module(s) 232 and input device(s) 252 via the input interface module(s) 248, the I/O interface 246, and the I/O and/or peripheral control module 244. An input device 252 includes a keypad, a keyboard, control switches, a touchpad, a microphone, a camera, etc. An input interface module 248 includes a software driver and a hardware connector for coupling an input device to the I/O and/or peripheral control module 244. In an embodiment, an input interface module 248 is in accordance with one or more Universal Serial Bus (USB) protocols.

The core control module 230 coordinates data communications between the processing module(s) 232 and output device(s) 254 via the output interface module(s) 250 and the I/O and/or peripheral control module 244. An output device 254 includes a speaker, auxiliary memory, headphones, etc. An output interface module 250 includes a software driver and a hardware connector for coupling an output device to the I/O and/or peripheral control module 244. In an embodiment, an output interface module 250 is in accordance with one or more audio codec protocols.

The processing module 232 communicates directly with a video graphics processing module 240 to display data on the display 242. The display 242 includes an LED (light emitting diode) display, an LCD (liquid crystal display), and/or other type of display technology. The display has a resolution, an aspect ratio, and other features that affect the quality of the display. The video graphics processing module 240 receives data from the processing module 232, processes the data to produce rendered data in accordance with the characteristics of the display, and provides the rendered data to the display 242.

Figure 2G:
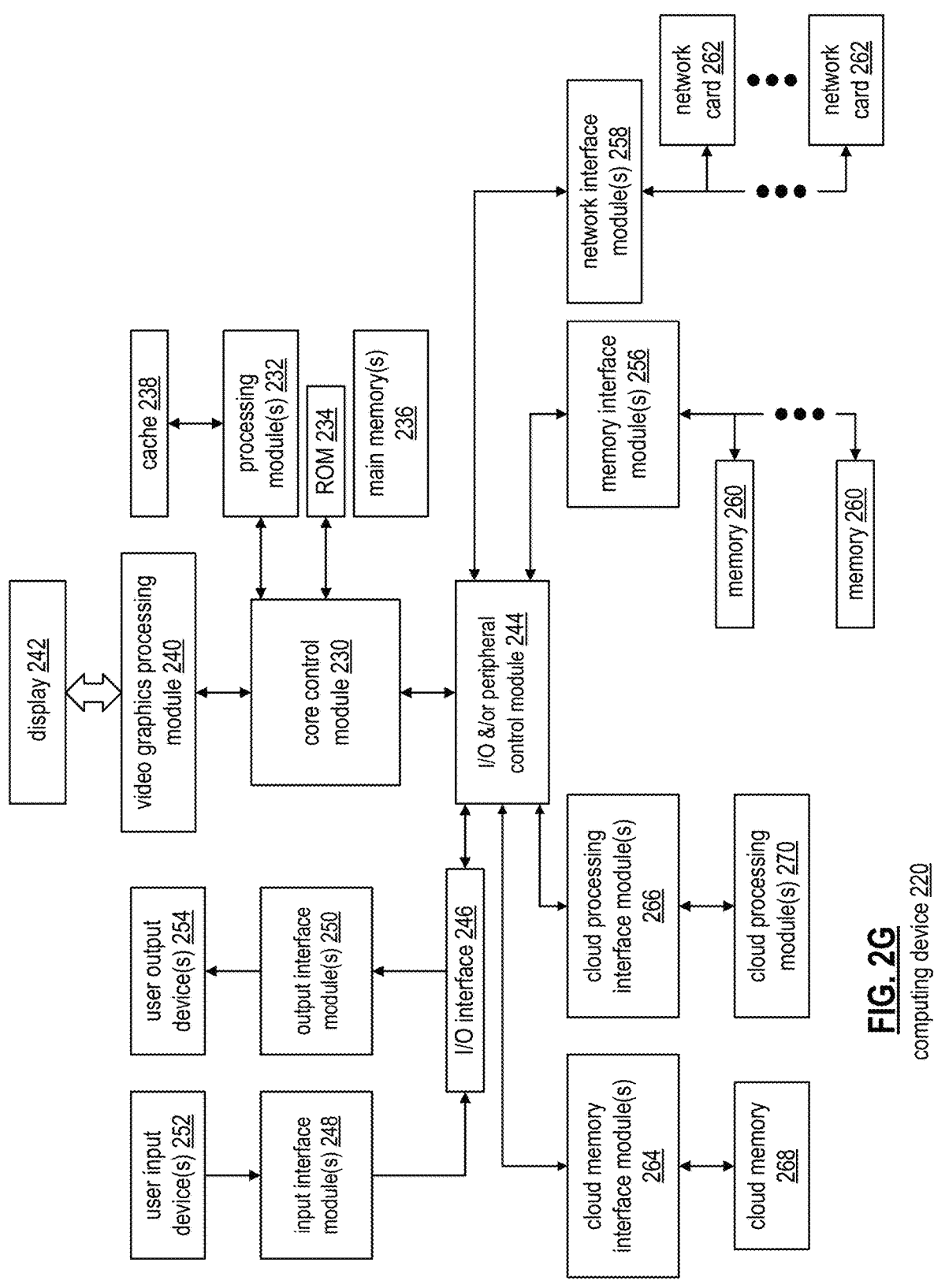

FIG. 2G is a schematic block diagram of an embodiment of a computing device 220 that includes a plurality of computing resources similar to the computing resources of FIG. 2F with the addition of one or more cloud memory interface modules 264, one or more cloud processing interface modules 266, cloud memory 268, and one or more cloud processing modules 270. The cloud memory 268 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 270 is similar to processing module 232 but is remote from the core control module and is accessed via a network.

Figure 2H:
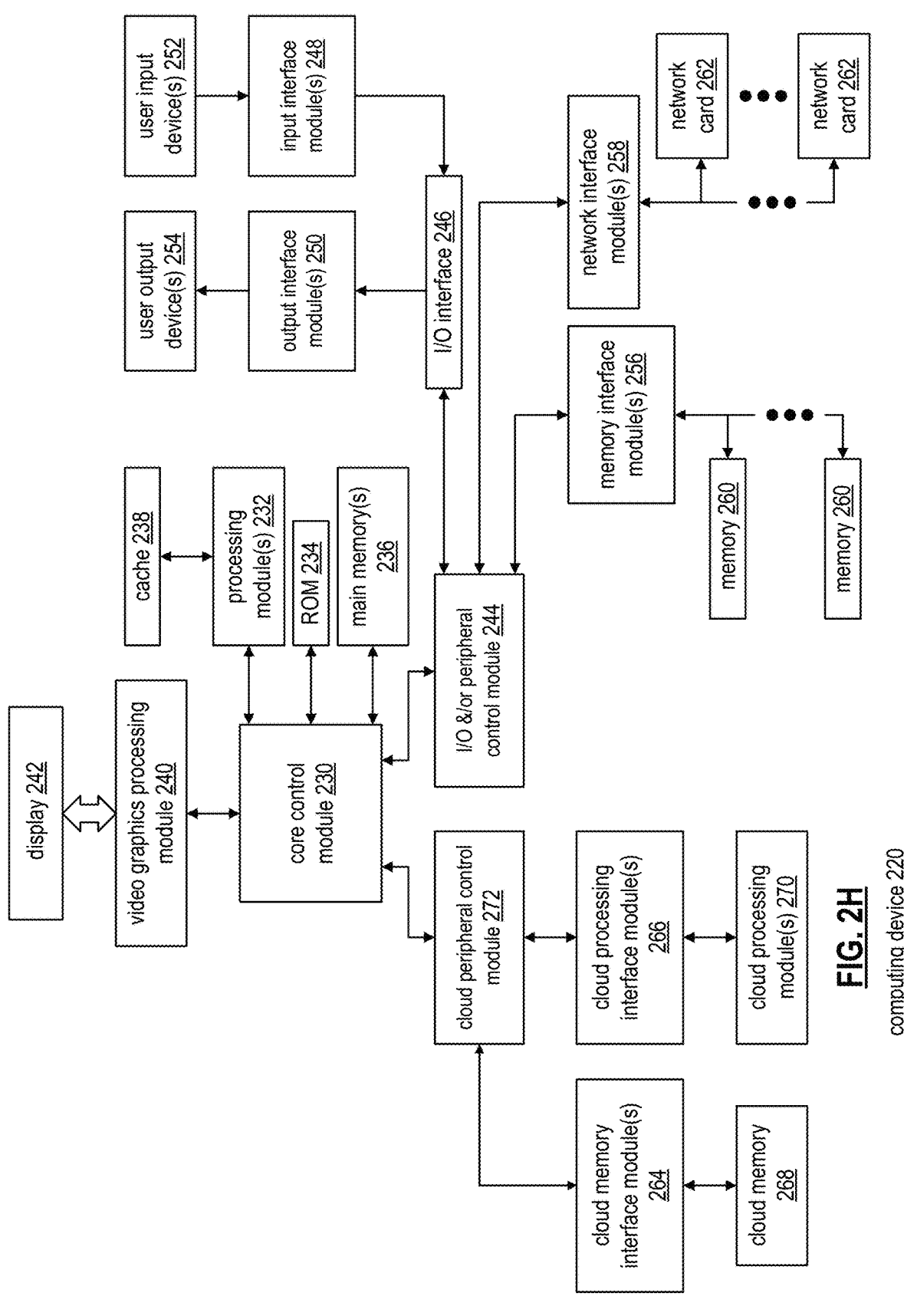

FIG. 2H is a schematic block diagram of an embodiment of a computing device 220 that includes a plurality of computing resources similar to the computing resources of FIG. 2G with a change in how the cloud memory interface module(s) 264 and the cloud processing interface module(s) 266 are coupled to the core control module 230. In this embodiment, the interface modules 264 and 266 are coupled to a cloud peripheral control module 272 that directly couples to the core control module 230.

Figure 2I:
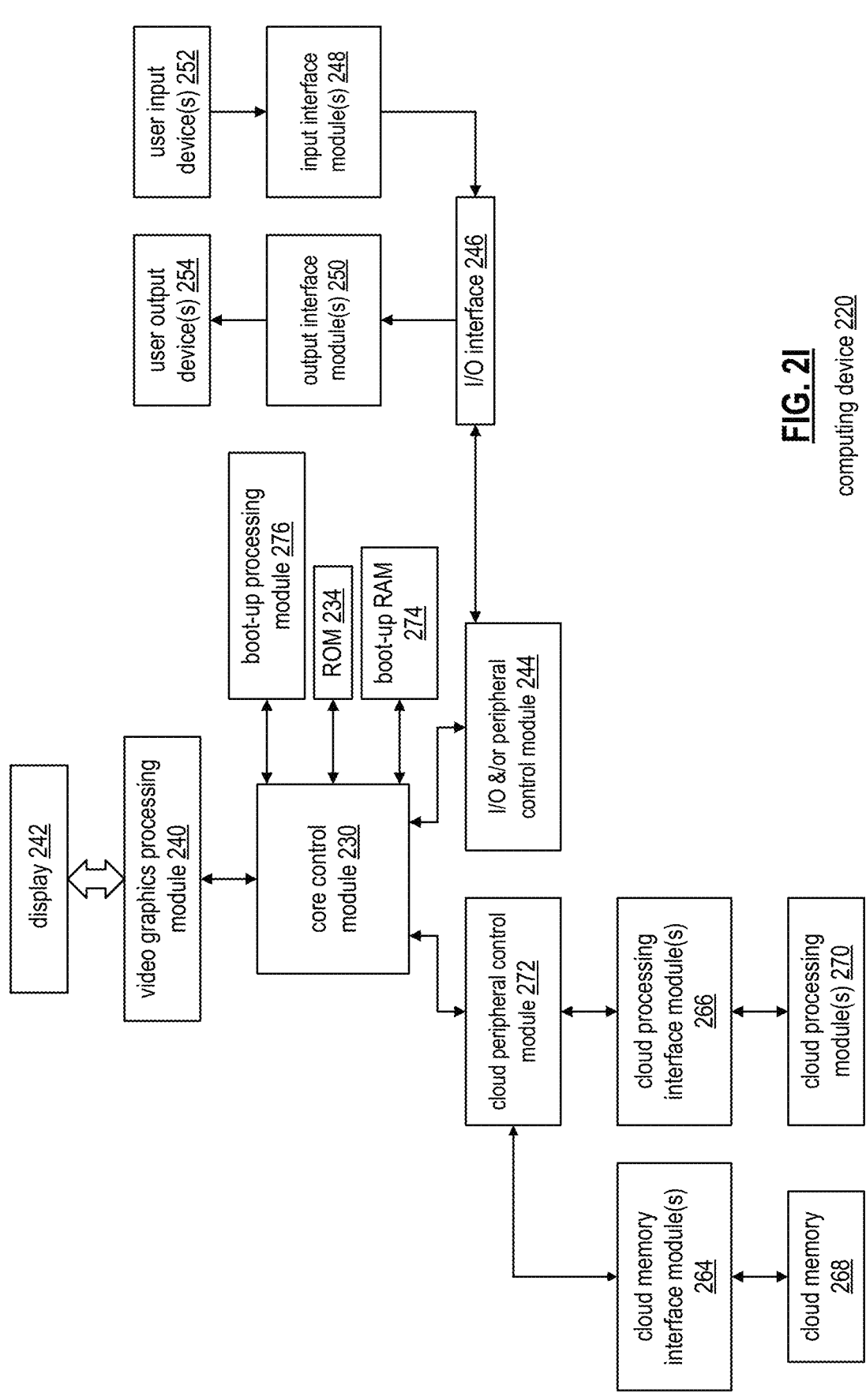

FIG. 2I is a schematic block diagram of an embodiment of a computing device 220 that includes a plurality of computing resources, which includes include a core control module 230, a boot up processing module 276, boot up RAM 274, a read only memory (ROM) 234, a one or more video graphics processing modules 240, one or more displays 48 (optional), an Input-Output (I/O) peripheral control module 244, one or more input interface modules 248, one or more output interface modules 250, one or more cloud memory interface modules 264, one or more cloud processing interface modules 266, cloud memory 268, and cloud processing module(s) 270.

In this embodiment, the computing device 220 includes enough processing resources (e.g., module 276, ROM 234, and RAM 274) to boot up. Once booted up, the cloud memory 268 and the cloud processing module(s) 270 function as the computing device's memory (e.g., main and hard drive) and processing module.

Figure 2J:
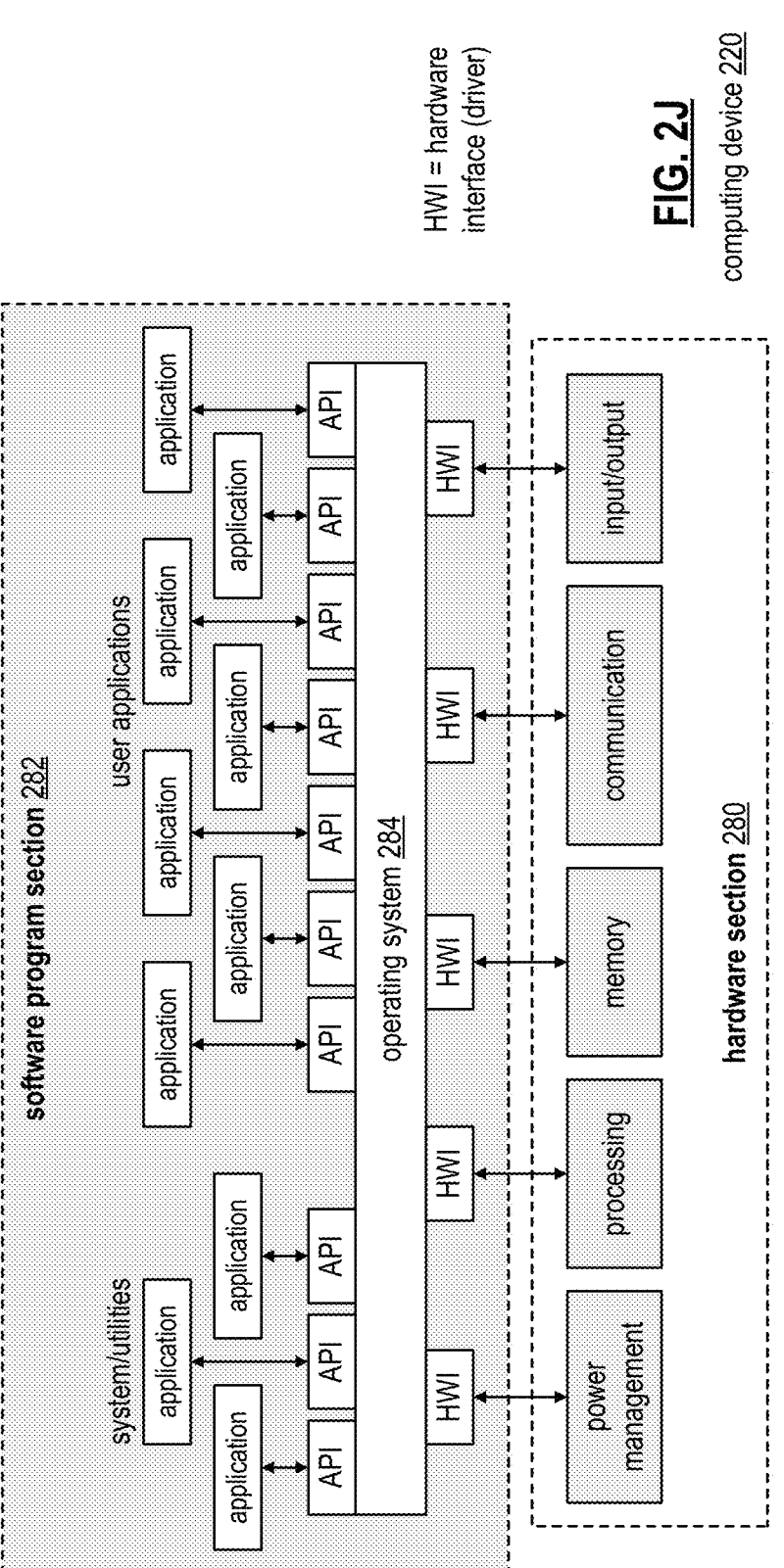

FIG. 2J is a schematic block diagram of another embodiment of a computing device 220 that includes a hardware section 280 and a software program section 282. The hardware section 280 includes the hardware functions of power management, processing, memory, communications, and input/output. FIG. 2L illustrates the hardware section 280 in greater detail.

The software program section 282 includes an operating system 284, system and/or utilities applications, and user applications. The software program section further includes APIs and HWIs. APIs (application programming interface) are the interfaces between the system and/or utilities applications and the operating system and the interfaces between the user applications and the operating system 284. HWIs (hardware interface) are the interfaces between the hardware components and the operating system. For some hardware components, the HWI is a software driver. The functions of the operating system 284 are discussed in greater detail with reference to FIG. 2K.

Figure 2K:
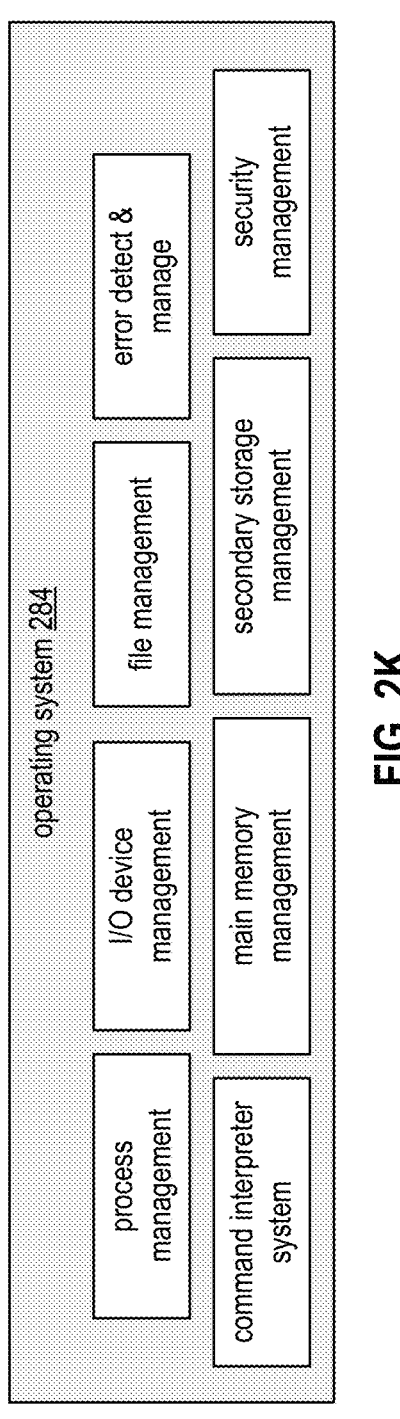
Figure 2L:
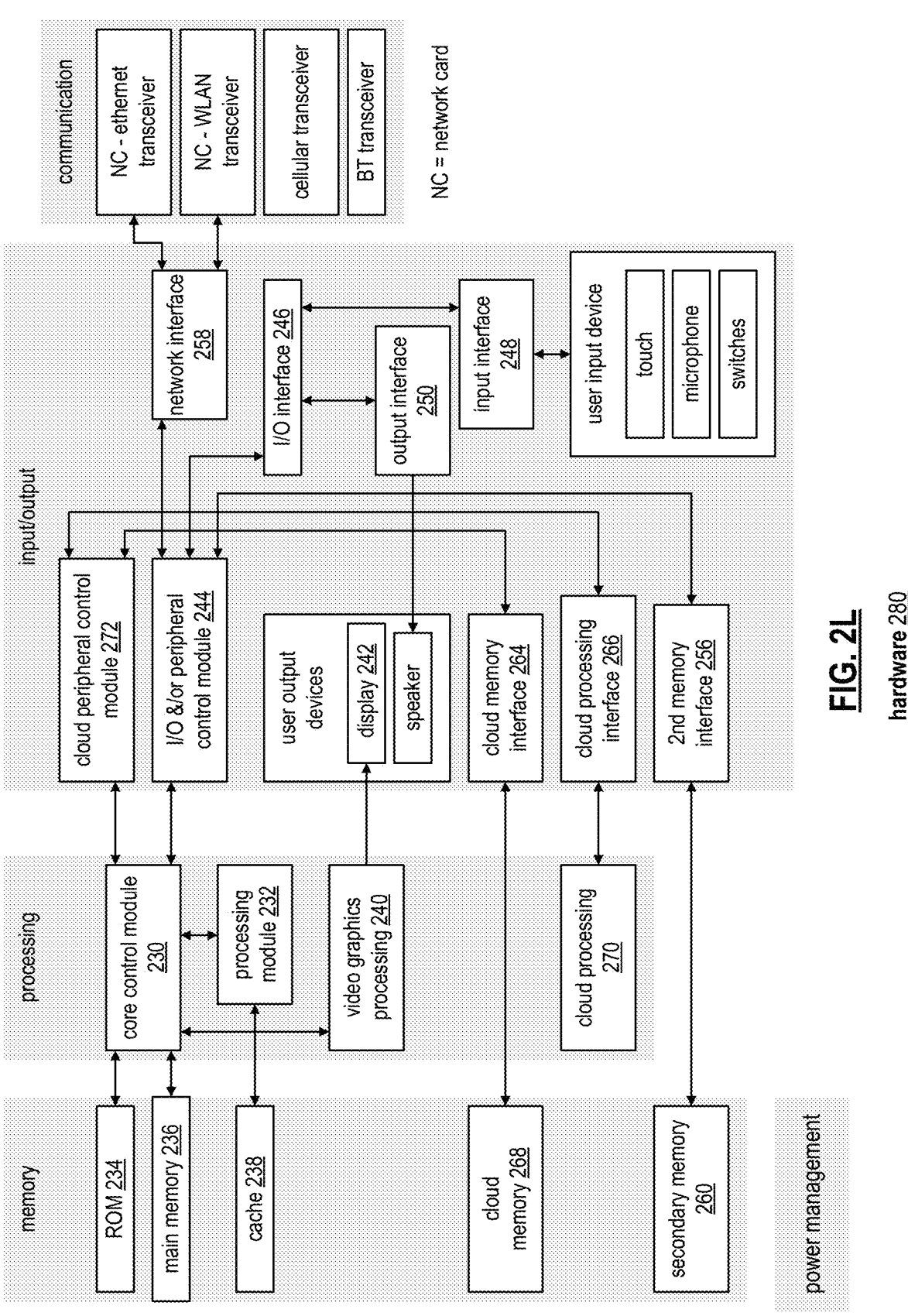

FIG. 2K is a diagram of an example of the functions of the operating system of a computing device 220. In general, the operating system function to identify and route input data to the right places within the computer and to identify and route output data to the right places within the computer. Input data is with respect to the processing module and includes data received from the input devices, data retrieved from main memory, data retrieved from secondary memory, and/or data received via a network card. Output data is with respect to the processing module and includes data to be written into main memory, data to be written into secondary memory, data to be displayed via the display and/or an output device, and data to be communicated via a network care.

The operating system 284 includes the OS functions of process management, command interpreter system, I/O device management, main memory management, file management, secondary storage management, error detection & correction management, and security management. The process management OS function manages processes of the software section operating on the hardware section, where a process is a program or portion thereof.

The process management OS function includes a plurality of specific functions to manage the interaction of software and hardware. The specific functions include:

load a process for execution;

enable at least partial execution of a process;

suspend execution of a process;

resume execution of a process;

terminate execution of a process;

load operational instructions and/or data into main memory for a process;

provide communication between two or more active processes;

avoid deadlock of a process and/or interdependent processes; and control access to shared hardware components.

The I/O Device Management OS function coordinates translation of input data into programming language data and/or into machine language data used by the hardware components and translation of machine language data and/or programming language data into output data. Typically, input devices and/or output devices have an associated driver that provides at least a portion of the data translation. For example, a microphone captures analog audible signals and converts them into digital audio signals per an audio encoding format. An audio input driver converts, if needed, the digital audio signals into a format that is readily usable by a hardware component.

The File Management OS function coordinates the storage and retrieval of data as files in a file directory system, which is stored in memory of the computing device. In general, the file management OS function includes the specific functions of:

File creation, editing, deletion, and/or archiving;

Directory creation, editing, deletion, and/or archiving;

Memory mapping files and/or directors to memory locations of secondary memory; and Backing up of files and/or directories.

The Network Management OS function manages access to a network by the computing device. Network management includes Network fault analysis;

Network maintenance for quality of service;

Network access control among multiple clients; and

Network security upkeep.

The Main Memory Management OS function manages access to the main memory of a computing device. This includes keeping track of memory space usage and which processes are using it; allocating available memory space to requesting processes; and deallocating memory space from terminated processes.

The Secondary Storage Management OS function manages access to the secondary memory of a computing device. This includes free memory space management, storage allocation, disk scheduling, and memory defragmentation.

The Security Management OS function protects the computing device from internal and external issues that could adversely affect the operations of the computing device. With respect to internal issues, the OS function ensures that processes negligibly interfere with each other; ensures that processes are accessing the appropriate hardware components, the appropriate files, etc.; and ensures that processes execute within appropriate memory spaces (e.g., user memory space for user applications, system memory space for system applications, etc.).

The security management OS function also protects the computing device from external issues, such as, but not limited to, hack attempts, phishing attacks, denial of service attacks, bait and switch attacks, cookie theft, a virus, a trojan horse, a worm, click jacking attacks, keylogger attacks, eavesdropping, waterhole attacks, SQL injection attacks, and DNS spoofing attacks.

FIG. 2L is a schematic block diagram of the hardware components of the hardware section 280 of a computing device. The memory portion of the hardware section includes the ROM 234, the main memory 236, the cache memory 238, the cloud memory 268, and the secondary memory 260. The processing portion of the hardware section includes the core control module 230, the processing module 232, the video graphics processing module 240, and the cloud processing module 270.

The input/output portion of the hardware section includes the cloud peripheral control module 272, the I/O and/or peripheral control module 244, the network interface module 258, the I/O interface module 246, the output device interface 250, the input device interface 248, the cloud memory interface module 264, the cloud processing interface module 266, and the secondary memory interface module 256. The IO portion further includes input devices such as a touch screen, a microphone, and switches. The IO portion also includes output devices such as speakers and a display.

The communication portion includes an ethernet transceiver network card (NC), a WLAN network card, a cellular transceiver, a Bluetooth transceiver, and/or any other device for wired and/or wireless network communication.

Figure 2M:
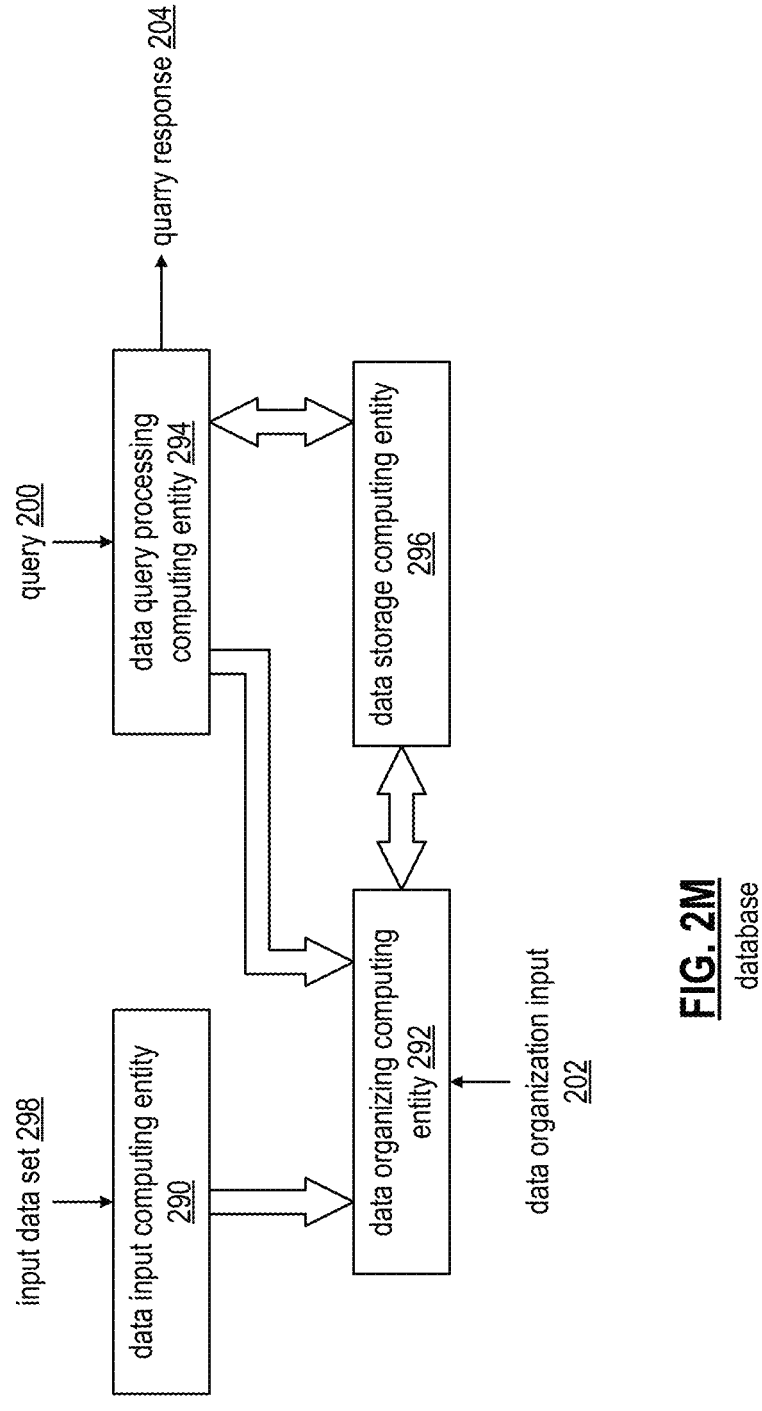
FIG. 2M is a schematic block diagram of an example of a database.

FIG. 2M is a schematic block diagram of an embodiment of a database that includes a data input computing entity 290, a data organizing computing entity 292, a data query processing computing entity 294, and a data storage computing entity 296. Each of the computing entities is an implementation in accordance with one or more of the embodiments of FIGS. 2A through 2E.

The data input computing entity 290 is operable to receive an input data set 298. The input data set 298 is a collection of related data that can be represented in a tabular form of columns and rows, and/or other tabular structure. In an example, the columns represent different data elements of data for a particular source and the rows corresponds to the different sources (e.g., employees, licenses, email communications, etc.).

If the data set 298 is in a desired tabular format, the data input computing entity 290 provides the data set to the data organizing computing entity 292. If not, the data input computing entity 290 reformats the data set to put it into the desired tabular format.

The data organizing computing entity 292 organizes the data set 298 in accordance with a data organizing input 202. In an example, the input 202 is regarding a particular query and requests that the data be organized for efficient analysis of the data for the query. In another example, the input 202 instructions the data organizing computing entity 192 to organize the data in a time-based manner. The organized data is provided to the data storage computing entity for storage.

When the data query processing computing entity 294 receives a query 200, it accesses the data storage computing entity 296 regarding a data set for the query. If the data set is stored in a desired format for the query, the data query processing computing entity 294 retrieves the data set and executes the query to produce a query response 204. If the data set is not stored in the desired format, the data query processing computing entity 294 communicates with the data organizing computing entity 292, which re-organizes the data set into the desired format.

Figure 3:
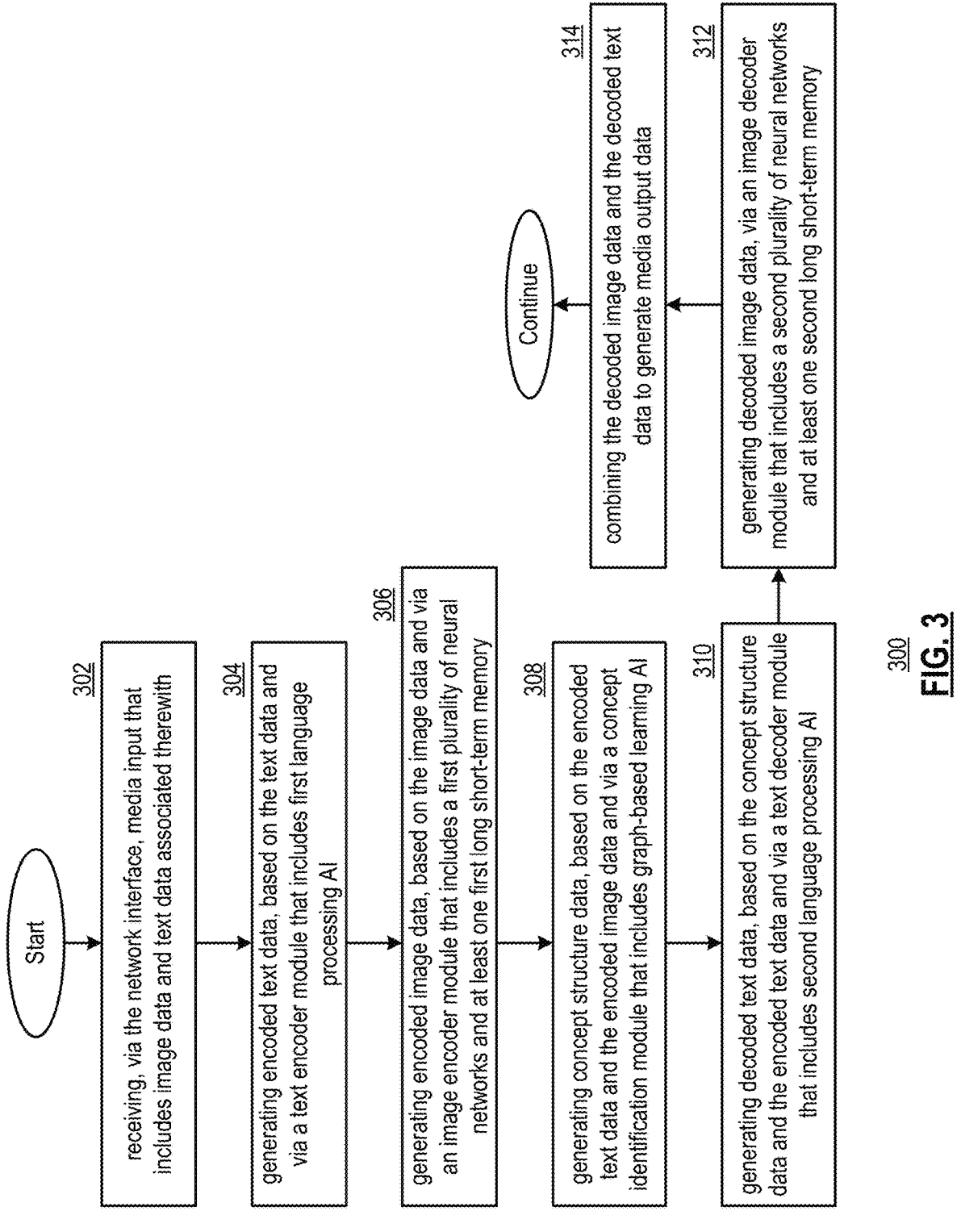
FIG. 3 presents a flowchart representation of an example method.

FIG. 3 presents a flowchart representation of an example method. In particular, a method 300 is presented for use, for example, in conjunction with modular AI platform 100. Step 302 includes receiving, via a network interface, media input that includes image data and text data associated therewith. Step 304 includes generating encoded text data, based on the text data and via a text encoder module that includes first language processing AI. Step 306 includes generating encoded image data, based on the image data and via an image encoder module that includes a first plurality of neural networks and at least one first long short-term memory.

Step 308 includes generating concept structure data, based on the encoded text data and the encoded image data and via a concept identification module that includes graph-based learning AI. Step 310 includes generating decoded text data, based on the concept structure data and the encoded text data and via a text decoder module that includes second language processing AI. Step 312 includes generating decoded image data, based on the concept structure data and the encoded image data and via an image decoder module that includes a second plurality of neural networks and at least one second long short-term memory. Step 314 includes combining the decoded image data and the decoded text data to generate media output data.

In addition or the alternative to any of the foregoing, the image decoder module and the text decoder module are trained based on the concept structure data.

In addition or the alternative to any of the foregoing, the image encoder module and the text encoder module are trained based on the concept structure data.

In addition or the alternative to any of the foregoing, the first language processing AI includes a Bidirectional Encoder Representations from Transformers (BERT) AI model.

In addition or the alternative to any of the foregoing, the second language processing AI includes a Bidirectional Encoder Representations from Transformers (BERT) AI model.

In addition or the alternative to any of the foregoing, the first plurality of neural networks includes k U-net models operating as k-experts.

In addition or the alternative to any of the foregoing, the k-experts are trained independently on different subsets of the data, and outputs of k-experts are then combined using a gating mechanism that selects a most relevant one of the k-experts for each input image of the image data.

In addition or the alternative to any of the foregoing, the concept identification module includes a third long short-term memory that processes the encoded image data for input to the graph-based learning AI.

In addition or the alternative to any of the foregoing, the concept identification module includes a fourth long short-term memory that processes the encoded text data for input to the graph-based learning AI.

In addition or the alternative to any of the foregoing, the graph-based learning AI operates based on a GraphSAGE model.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As used herein the terms "tool" and "toolkit" correspond to a website, utility, platform, and/or software routine that performs one or more specific functions.

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the FIGS. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure., the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures. presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium or a non-transitory machine-readable storage medium.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A modular artificial intelligence (AI) platform comprises:
  a network interface configured to communicate via a network;
  at least one processor; and
  a non-transitory machine-readable storage medium that stores operational instructions that, when executed by the at least one processor, cause the at least one processor to perform operations that include:
    receiving, via the network interface, media input that includes image data and text data associated therewith;
    generating encoded text data, based on the text data and via a text encoder module that includes first language processing AI;

generating encoded image data, based on the image data and via an image encoder module that includes a first plurality of neural networks and at least one first long short-term memory;

generating concept structure data, based on the encoded text data and the encoded image data and via a concept identification module that includes graph-based learning AI;

generating decoded text data, based on the concept structure data and the encoded text data and via a text decoder module that includes second language processing AI;

generating decoded image data, based on the concept structure data and the encoded image data and via an image decoder module that includes a second plurality of neural networks and at least one second long short-term memory; and combining the decoded image data and the decoded text data to generate media output data.

2. The modular AI platform of claim 1, wherein the image decoder module and the text decoder module are trained based on the concept structure data.

3. The modular AI platform of claim 1, wherein the image encoder module and the text encoder module are trained based on the concept structure data.

4. The modular AI platform of claim 1, wherein the first language processing AI includes a Bidirectional Encoder Representations from Transformers (BERT) AI model.

5. The modular AI platform of claim 1, wherein the second language processing AI includes a Bidirectional Encoder Representations from Transformers (BERT) AI model.

6. The modular AI platform of claim 1, wherein the first plurality of neural networks includes k U-net models operating as k-experts.

7. The modular AI platform of claim 6, wherein the k-experts are trained independently on different subsets of the data, and outputs of k-experts are then combined using a gating mechanism that selects a most relevant one of the k-experts for each input image of the image data.

8. The modular AI platform of claim 1, wherein the concept identification module includes a third long short-term memory that processes the encoded image data for input to the graph-based learning AI.

9. The modular AI platform of claim 1, wherein the concept identification module includes a fourth long short-term memory that processes the encoded text data for input to the graph-based learning AI.

10. The modular AI platform of claim 1, wherein the graph-based learning AI operates based on a GraphSAGE model.

11. A method comprises:

receiving, via a network interface, media input that includes image data and text data associated therewith;

generating encoded text data, based on the text data and via a text encoder module that includes first language processing AI;

generating encoded image data, based on the image data and via an image encoder module that includes a first plurality of neural networks and at least one first long short-term memory;

generating concept structure data, based on the encoded text data and the encoded image data and via a concept identification module that includes graph-based learning AI;

generating decoded text data, based on the concept structure data and the encoded text data and via a text decoder module that includes second language processing AI;

generating decoded image data, based on the concept structure data and the encoded image data and via an image decoder module that includes a second plurality of neural networks and at least one second long short-term memory; and combining the decoded image data and the decoded text data to generate media output data.

12. The method of claim 11, wherein the image decoder module and the text decoder module are trained based on the concept structure data.

13. The method of claim 11, wherein the image encoder module and the text encoder module are trained based on the concept structure data.

14. The method of claim 11, wherein the first language processing AI includes a Bidirectional Encoder Representations from Transformers (BERT) AI model.

15. The method of claim 11, wherein the second language processing AI includes a Bidirectional Encoder Representations from Transformers (BERT) AI model.

16. The method of claim 11, wherein the first plurality of neural networks includes k U-net models operating as k-experts.

17. The method of claim 16, wherein the k-experts are trained independently on different subsets of the data, and outputs of k-experts are then combined using a gating mechanism that selects a most relevant one of the k-experts for each input image of the image data.

18. The method of claim 11, wherein the concept identification module includes a third long short-term memory that processes the encoded image data for input to the graph-based learning AI.

19. The method of claim 11, wherein the concept identification module includes a fourth long short-term memory that processes the encoded text data for input to the graph-based learning AI.

20. The method of claim 11, wherein the graph-based learning AI operates based on a GraphSAGE model.

* * * * *